United States Patent [19]
Mudd
[11] 4,370,167
[45] Jan. 25, 1983

[54] ASBESTOS-FREE DRYWALL JOINT COMPOUND UTILIZING SEPIOLITE CLAY AS ASBESTOS SUBSTITUTE

[75] Inventor: Patrick J. Mudd, Tonawanda, N.Y.

[73] Assignee: National Gypsum Company, Dallas, Tex.

[21] Appl. No.: 358,264

[22] Filed: Mar. 15, 1982

[51] Int. Cl.$^{3}$ ........ C04B 1/00
[52] U.S. Cl. ........ 106/119
[58] Field of Search ........ 106/119, 109

[56] References Cited

U.S. PATENT DOCUMENTS

| | | | |
|---|---|---|---|
| 3,891,453 | 6/1975 | Williams | 106/109 |
| 4,286,995 | 9/1981 | Smith et al. | 106/109 |
| 4,287,103 | 9/1981 | Green et al. | 106/109 |

*Primary Examiner*—James Poer
*Attorney, Agent, or Firm*—Robert F. Hause

[57] ABSTRACT

Drywall joint compounds in which asbestos fiber has been omitted and the physical characteristics which have heretofore depended on the presence of asbestos fiber or on attapulgite clay have been obtained by the inclusion of finely powdered sepiolite clay.

6 Claims, 1 Drawing Figure

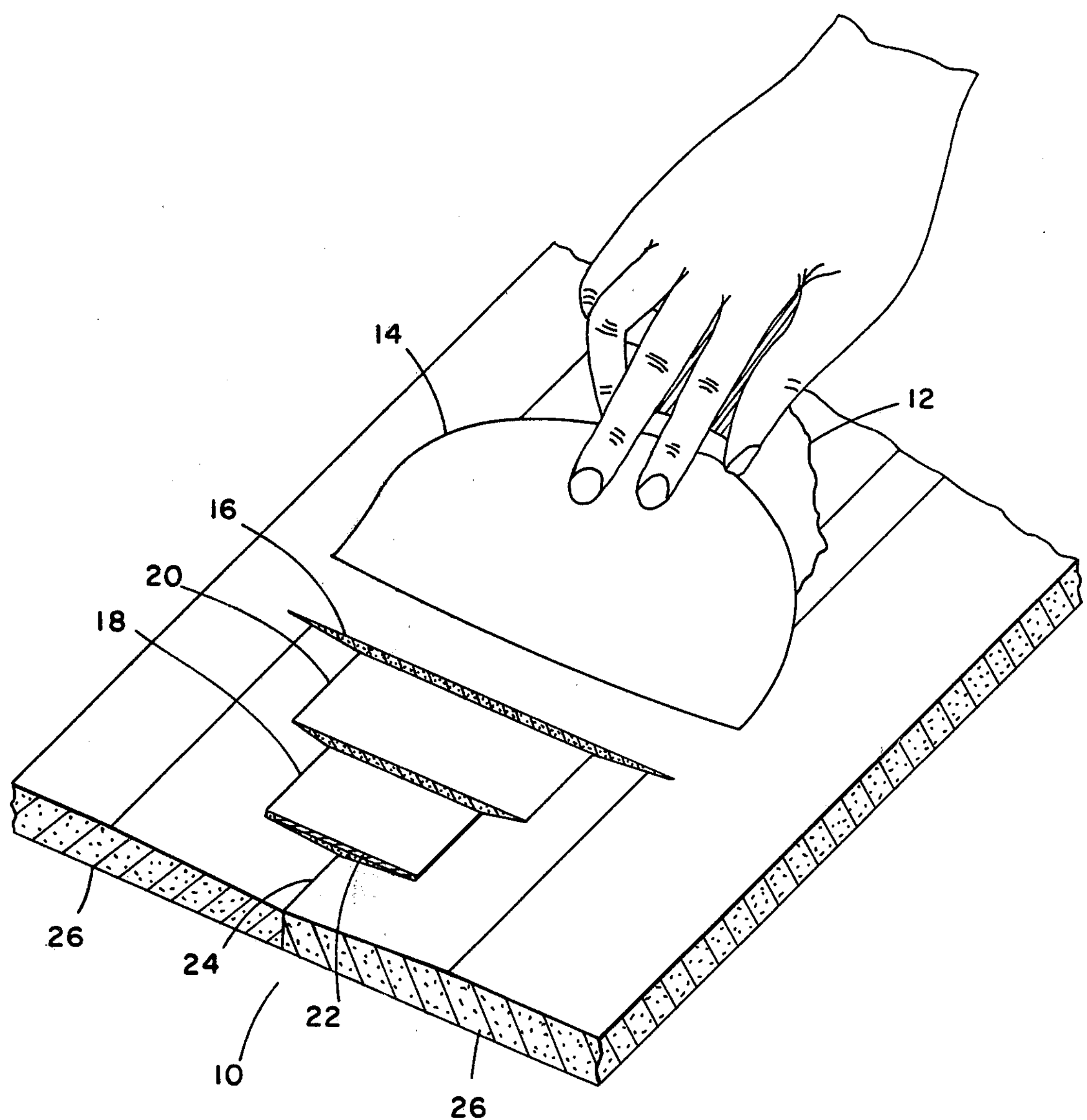
14
12
16
20
18
26
24
22
10
26

ASBESTOS-FREE DRYWALL JOINT COMPOUND UTILIZING SEPIOLITE CLAY AS ASBESTOS SUBSTITUTE

This invention relates to drywall joint treatment compounds which have been improved in an ecological and economical sense. For decades, substantially all drywall joint compounds included a portion of asbestos fiber in the formulation. A definite effort began years ago to eliminate asbestos fibers in products of all kinds, due to the belief that asbestos fibers can be dangerous from a health standpoint.

Initial efforts in eliminating asbestos in joint compounds resulted in incorporating attapulgite clay and particularly attapulgite clay plus a flocculating agent for the attapulgite clay in the formulations, as in U.S. Pat. No. 3,907,725.

Attapulgite clay is a class of clay which is available only in Attapulgus, Georgia. The only known similar clay is polygorskite, which is found in Russia. Because of the limited geographical source for this ingredient, an alternate material which can replace the attapulgite clay in joint compounds has long been sought.

In accordance with the present invention, joint compounds are provided free of asbestos and attapulgite clay, which provide all the characteristics of prior commercially acceptable joint compounds.

It is an object of the present invention to provide a novel formulation of a dry powder for use as a drywall joint compound.

It is an object of the present invention to provide a novel formulation of an aqueous paste for use as a drywall joint compound.

It is a further object to provide such joint compounds which are substantially free of asbestos and of attapulgite clay.

It is a still further object to provide such joint compounds which have good plasticity, water retention, cohesiveness and viscosity stability.

These and other objects and advantages of the invention will be more readily apparent when considered in relation to the preferred embodiments as set forth in the specification and the drawing in which a wallboard joint section is shown in perspective with joint compound made in accordance with the invention applied thereto and being applied thereto.

Referring to the drawing there is shown a short section of a drywall joint area 10 on which ready-mix joint compound 12 is being hand applied, using a broad knife 14, forming a smooth-surfaced top coat 16.

The joint compound 12 shown is made in accordance with the invention however it is applied in the same way, and appears the same, as prior joint compounds.

There are also shown a bed coat 18 of joint compound 12 and a first finish coat 20 of joint compound 12, both of which have hardened and dried prior to the application of the smooth-surfaced top coat 16. Bed coat 18 and first finish coat 20 can both be made from the same asbestos-free and attapulgite clay-free ready-mix joint compound 12 as is top coat 16. The bed coat 18 has a narrow paper joint tape 22 embedded within it to provide a reinforcement of the final joint treatment along the joint 24 between the two gypsum wallboards 26.

The joint compound 12 is an asbestos-free and attapulgite clay-free paste formulation suitable for manufacture in paste form, storage, shipment and then ultimate use, all as has been accomplished heretofore with asbestos- or attapulgite clay-containing ready-mix joint compounds.

Joint compound 12 may be made in accordance with the following formulation:

| | PARTS BY WEIGHT |
|---|---|
| Polyvinylacetate latex binder (58% solids) | 6.0 |
| Dipropylene glycol dibenzoate plasticizer | 0.2 |
| Fine ground limestone | 48.25 |
| Dry ground mica | 9.65 |
| Fine ground sepiolite clay | 1.6 |
| Polyacrylamide resin | .05 |
| Hydroxypropyl methyl cellulose | .45 |
| Water | 33.8 |
| | 100.00 |

The polyvinyl acetate binder employed was Union Carbide Latex WC 130. Many other binders can be substituted as is well known in the art, including other latex emulsions, starch, caseins, etc. Dipropylene glycol dibenzoate plasticizer, which is preferably used in conjunction with the polyvinyl acetate binder, was obtained as Benzoflex 9-88 from Velsicol Chemical Corporation.

The fine ground limestone had a fineness of between 80 and 99 percent through a 325 mesh U.S. Standard Sieve. The dry ground mica was Asheville Mica Company's grade AMC. The limestone, mica and the clay are all fine inorganic filler materials each contributing certain physical characteristics to the final product, as fine inorganic filler materials have in prior joint compounds.

The fine ground sepiolite clay is available from Industrial Mineral Ventures and is identified as Imvite IGS. A typical chemical analysis of Imvite IGS is:

| | |
|---|---|
| $SiO_2$ | 56.0% |
| $Al_2O_3$ | 4.0% |
| MgO | 20.0% |
| $Fe_2O_3$ | 1.0% |
| CaO | 0.5% |
| $K_2O$ | 1.4% |
| $Na_2O$ | 1.4% |
| L.O.I. (1000° C.) | 15.7% |

Metals listed are complexed in the mineral structure and do not exist as free oxides.

The particle size of the Imvite IGS is such that at least 95% will pass through a 200 mesh dry screen. The moisture content is no more than 12%, the bulk density, uncompacted is 38 lbs/cu ft and the pH of a 6% aqueous slurry is 8.6. The surface area, fully dispersed is 200 $m^2/g$.

The polyacrylamide resin can be obtained from Dow Chemical Company identified as Dow Resin 164. The polyacrylamide resin is a floccing agent which flocculates the sepiolite clay. Flocculation of sepiolite clay does not appear as critical as the flocculation of attapulgite clay, described in U.S. Pat. No. 3,907,725, and accordingly the polyacrylamide may be omitted from the above formulation. The hydroxypropyl methylcellulose thickener will provide a lesser but sufficient amount of flocculation of the sepiolite clay.

The hydroxypropyl methylcellulose may be Dow Chemical Company's Methocel HG 228, which provides a known thickening function in joint compounds.

The amount of water may be varied, with variations in the amount of other ingredients, in order to provide the desired viscosity of joint compound, of about 400 to 700 Brabender units.

Many other ingredients may be added to the formulation of a joint compound in accordance with the invention, all as are well known in the industry, including, for example, about 1 percent starch binder, about 5 percent non-fibrous talc, about 0.1 percent defoaming agent or about 0.5 percent propylene glycol antifreeze, or combinations thereof.

The mixing of the ingredients of the ready-mix joint compound 12 is of importance. In the preferred method, substantially all of the water is put into the mixer first. As the other ingredients are added, the mixing of the ingredients with the water and with each other is carried on.

Whereas the description above of what is shown in the drawing described a ready-mix joint compound 12, it will be understood that the drawing is also suitable for understanding the use of a dry powder formulation which is in accordance with the present invention. A dry powder formulation as disclosed herebelow may be mixed with water and is then used in exactly the same way as ready-mix joint compound 12.

| | PARTS BY WEIGHT |
|---|---|
| Polyvinyl alcohol binder | 0.80 |
| Starch binder | 1.54 |
| Fine ground limestone | 50.70 |
| Dry ground mica | 6.14 |
| Fine ground sepiolite clay | 3.06 |
| Polyacrylamide resin | .01 |
| Hydroxypropyl methylcellulose | .25 |
| | 62.50 |

The above dry powder formulation, when mixed with about 37.5 parts by weight of water will produce an on-the-job mixture of joint compound which performs quite similar to prior dry powder formulations containing asbestos.

Minor amounts of dry preservative and defoaming agents and other known additives may also be incorporated in the dry formulations made in accordance with the invention, similar to their use in prior asbestos-containing dry powder formulations.

Variations may be made in the relative content of the various ingredients in accordance with the invention. The ingredients of the dry powder formulation and the solids of the ready-mix paste may vary substantially as follows:

| | PERCENTAGE BY WEIGHT |
|---|---|
| Fine ground fillers | 50-99 |
| Binder | 1-50 |
| Thickener | 0.1-5.0 |
| Sepiolite clay | 0.1-5.0 |

The formulations will include a floccing agent for the clay, such as about 0.1 to 5.0 parts by weight for every 10 parts sepiolite clay; however, this function may be performed by the thickener.

Joint compounds made in accordance with the invention have been found to approach the characteristics and qualities of prior joint compounds containing asbestos closer than any other known asbestos-free formulation.

Having completed a detailed disclosure of the preferred embodiments of our invention, so that others may practice the same we contemplate that variations may be made without departing from the essence of the invention.

I claim:

1. A drywall joint compound, said compound being free of asbestos fiber and attapulgite clay, and comprising as dry solids, by weight, from about 50 to 98% of fine ground powdered fillers of about minus 325 mesh particle size and other than sepiolite clay, from about 1 to 50 percent of a binder composition for said filler, from about 0.1 to 5 percent of a thickener other than sepiolite clay, and from about 0.1 to 5 percent fine powdered sepiolite clay.

2. A drywall joint compound as in claim 1 further comprising a floccing agent for said clay other than said thickener in an amount of about 0.1 to 5.0 parts by weight for every 10 parts by weight of sepiolite clay.

3. A drywall joint compound as in claim 1 wherein said floccing agent is a polyacrylamide resin.

4. A dry powder joint compound formulation as defined in claim 1, comprising about 50 parts by weight fine powdered filler, about 1 part by weight polyvinyl alcohol, about 3 parts by weight fine powdered sepiolite clay, and about 0.2 part thickener.

5. A ready-mix joint compound as defined in claim 1 wherein said dry solids are thoroughly mixed in a paste with sufficient water to produce a paste viscosity of about 400 to 700 Brabender units.

6. A ready-mix joint compound as defined in claim 5 comprising about 50 parts by weight fine powdered filler, about 6 parts by weight latex binder, a minor amount of plasticizer for said binder relative to the amount of said binder, about 1 part by weight sepiolite clay, about 0.5 part by weight thickener and about 35 parts by weight of water.

* * * * *